No. 867,678. PATENTED OCT. 8, 1907.
W. H. SAUVAGE.
SLACK ADJUSTER.
APPLICATION FILED NOV. 21, 1906. RENEWED JUNE 21, 1907.
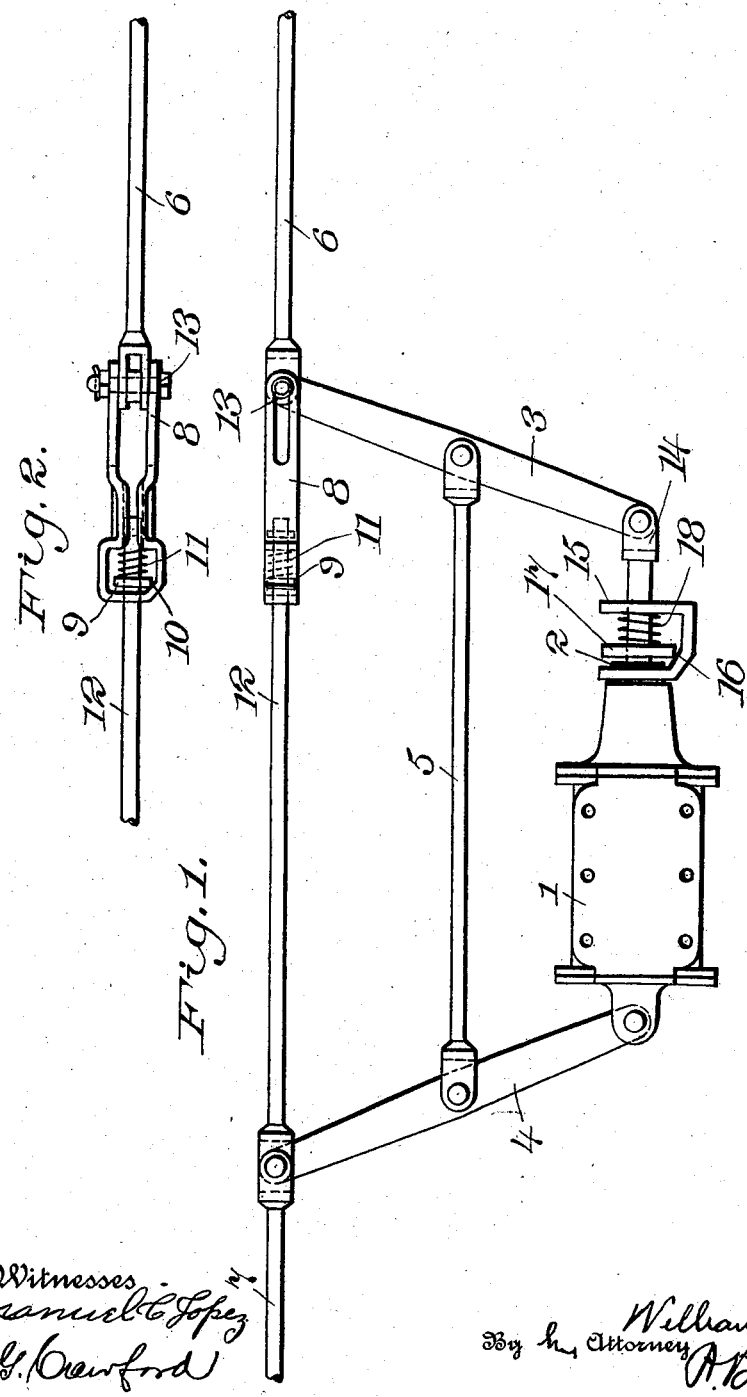

UNITED STATES PATENT OFFICE.

WILLIAM H. SAUVAGE, OF NEW YORK, N. Y., ASSIGNOR, BY MESNE ASSIGNMENTS, TO ATLAS SLACK ADJUSTER COMPANY, OF NEW YORK, N. Y., A CORPORATION OF NEW YORK.

SLACK-ADJUSTER.

No. 867,678.     Specification of Letters Patent.     Patented Oct. 8, 1907.

Application filed November 21, 1906, Serial No. 344,440. Renewed June 21, 1907. Serial No. 380,040.

*To all whom it may concern:*

Be it known that I, WILLIAM H. SAUVAGE, a citizen of the United States of America, and a resident of the borough of Manhattan, city, county, and State of New York, have invented certain new and useful Improvements in Slack-Adjusters, of which the following is a specification.

My invention relates to mechanism for taking up the slack of the brake rigging on railway cars where kick springs are used.

The best form of my invention at present known to me is shown in the accompanying drawings, in which:

Figure 1 is a portion of the usual brake rigging with my invention applied thereto, and Fig. 2 is a detail side elevation of the take-up clutch.

Throughout the drawings like reference figures indicate like parts.

1 is the compressed air cylinder, 2 the piston, 3 the right hand brake lever, 4 the left hand brake lever, 5 the tie-rod, 6 the right hand top rod and 7 the left hand top rod, all of the usual construction.

8 is a stirrup, pivoted to the brake lever 3 by the pin and slot connection 13. This stirrup is perforated for the passage of the rod 12, the other end of which is pivoted to the brake lever 4. The stirrup contains the perforated clutch dog 9 through which the rod 12 also passes. The clutch dog is fulcrumed on the beveled corner 10 of the stirrup and held in operative position by the spiral spring 11 mounted on the rod 12 and compressed between the clutch dog and the shoulders formed by the inwardly bent sides of the stirrup 8.

The piston 2 is of the type usual in freight car brake apparatus having hollow piston rod in which the push rod 14 telescopes. On this hollow piston rod is mounted a gripping device, preferably a friction clutch, composed of the frame 15 having the beveled corner 16 against which the perforated clutch dog 17 is fulcrumed, being held in operative position by the spiral spring 18 compressed between said dog and the other end of the frame 15. In operation, the slot 13 represents a predetermined maximum play of the two top rods 6 and 7 with reference one to another, which of course corresponds to a certain amplitude of piston travel. If this piston travel is exceeded, the pin in the end of brake lever 3 would strike the inner end of the slot 13 and force the stirrup 8 to the left by a distance corresponding to such excess of travel and the clutch dog 9 will grasp the rod 12 at the new position of adjustment. On the release of the brakes, the pin at the end of the brake lever 3 would strike the other end of slots 13 and the clutch dog 9 holding it will check further movement of the brake levers and hold out the push rod 14. The continued return motion of the piston 2 will drag the gripping device thereto attached to the left, cause it to seize the push rod in the new position of adjustment. The difference between the two positions of the clutch before and after the above described operation will be equal to the excess of the previous piston stroke over the predetermined minimum of piston travel and it is evident that all subsequent applications of the brake will produce only this minimum travel or less, until the brake shoes wear down again or a heavier application is made of the brakes.

The advantages of my invention comprise its accurate operation, simplicity, cheapness, and ease of application to existing brake structures without modification or removal of any of the existing parts of such brake apparatus.

While I prefer the friction clutch shown, other forms of friction clutch or gripping devices might be substituted therefor. The lost motion connection of the take-up part of the device to the brake levers might be varied and similar changes of mechanical details of construction made without departing from the spirit and scope of my invention.

Having, therefore, described my invention, I claim:

1. In a mechanism for automatically taking up and holding the slack in railway brakes, the combination with the usual cylinder, piston, brake levers and tie-rod, of a telescoping piston rod, a gripping device adapted to permit said piston rod to be lengthened, but prevent it being shortened, and mechanism connecting the outer ends of the brake levers and operating to lengthen the piston rod whenever the predetermined maximum travel of the piston is exceeded.

2. In a mechanism for automatically taking up and holding the slack in railway brakes, the combination with the usual cylinder, piston, brake levers and tie-rod, of a telescoping piston rod, a gripping device adapted to permit said piston rod to be lengthened, but prevent it being shortened, and mechanism connecting the outer ends of the brake levers and operating to lengthen the piston rod whenever the predetermined maximum travel of the piston is exceeded, said mechanism comprising a telescoping rod having a lost motion connection to the brake levers, and a gripping device adapted to permit the shortening but preventing the lengthening of said rod.

3. In a mechanism for automatically taking up and holding the slack in railway brakes, the combination with the usual cylinder, piston, brake levers and tie-rod, of a telescoping piston rod, a gripping device adapted to permit said piston rod to be lengthened, but prevent it being shortened, and mechanism connecting the outer ends of the brake levers and operating to lengthen the piston rod whenever the predetermined maximum travel of the piston is exceeded, said mechanism comprising a stirrup pivoted to one brake lever by a pin and slot connection, a rod pivoted to the other brake lever and telescoping into said stirrup, and a friction clutch mounted in said stirrup and engaging the said rod.

4. In a mechanism for automatically taking up and holding the slack in railway brakes, the combination with the usual cylinder, piston, brake levers and tie-rod of a telescoping piston rod, a gripping device adapted to permit said piston rod to be lengthened, but prevent being shortened, and mechanism connecting the outer ends of the brake levers and operating to lengthen the piston rod whenever the predetermined maximum travel of the piston is exceeded, said mechanism comprising a stirrup pivoted to one brake lever and perforated for the passage of a rod, a rod pivoted to the other brake lever and passing through this perforation, a perforated clutch dog mounted on said rod and in said stirrup, a spring forcing said dog into action and a lost motion connection between one of said brake levers and the member pivoted thereto.

5. In a mechanism for automatically taking up the slack in railway brakes, the combination with the usual cylinder, piston having a hollow piston rod, push rod, brake levers and tie-rod, of a friction clutch mounted on the hollow piston rod and engaging the push rod and a friction clutch mechanism extending between the outer ends of the brake levers and having a lost motion connection with one of them.

Signed at New York, N. Y. this 19th day of November, 1906.

WILLIAM H. SAUVAGE.

Witnesses:
A. PARKER-SMITH,
M. G. CRAWFORD.